United States Patent

Cheng

(10) Patent No.: US 10,976,615 B2
(45) Date of Patent: Apr. 13, 2021

(54) LIQUID CRYSTAL DISPLAY PANEL AND MANUFACTURING METHOD THEREOF

(71) Applicant: Wuhan China Star Optoelectronics Technology Co., Ltd., Wuhan (CN)

(72) Inventor: Wei Cheng, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/332,806

(22) PCT Filed: Jan. 2, 2019

(86) PCT No.: PCT/CN2019/070102
§ 371 (c)(1),
(2) Date: Mar. 13, 2019

(87) PCT Pub. No.: WO2020/087772
PCT Pub. Date: May 7, 2020

(65) Prior Publication Data
US 2020/0142236 A1    May 7, 2020

(30) Foreign Application Priority Data
Oct. 30, 2018    (CN) .......................... 201811272513.2

(51) Int. Cl.
*G02F 1/1339*    (2006.01)
*G02F 1/1335*    (2006.01)

(52) U.S. Cl.
CPC .... *G02F 1/13394* (2013.01); *G02F 1/133516* (2013.01); *G02F 1/133519* (2021.01)

(58) Field of Classification Search
CPC .... G02F 1/0107; G02F 1/1339; G02F 1/1341; G02F 2001/13415; H01L 51/524; H01L 51/5246; H01J 2329/867; H01J 2329/8675; H01J 9/261; Y10T 428/1059
See application file for complete search history.

(56) References Cited

U.S. PATENT DOCUMENTS

| | | | |
|---|---|---|---|
| 2017/0059771 A1* | 3/2017 | Yuki | G02F 1/133615 |
| 2017/0097528 A1* | 4/2017 | Kim | G02F 1/1339 |
| 2018/0035542 A1* | 2/2018 | Osawa | H05K 1/144 |
| 2018/0356670 A1* | 12/2018 | Kanehiro | G02F 1/133308 |
| 2019/0196243 A1* | 6/2019 | Shioaku | G02F 1/1339 |
| 2019/0331960 A1 | 10/2019 | Li et al. | |

FOREIGN PATENT DOCUMENTS

| | | |
|---|---|---|
| CN | 103246107 | 9/2015 |
| CN | 102854666 | 11/2015 |
| CN | 205787481 | 12/2016 |
| CN | 108594524 | 9/2018 |

* cited by examiner

*Primary Examiner* — Michael H Caley
*Assistant Examiner* — Mariam Qureshi

(57) ABSTRACT

A liquid crystal display panel and a manufacturing method thereof are provided. The liquid crystal display panel, by an in-panel hole defining process, defines an installation hole. A position of an array substrate corresponding to the installation hole is opened, and an inner surface of a color filter substrate corresponding to the installation hole 340 is curved such that the color filter substrate has a lens structure to decrease total reflection between air and the glass substrate and increase outwardly directed light and light emitting efficiency.

3 Claims, 4 Drawing Sheets

```
┌─────────────────────────────────────────────────────────────┐
│ Disposing a frame sealant between a color filter substrate  │  S610
│ and an array substrate and, wherein the frame sealant is    │
│ disposed in a region to be grinded of the color filter      │
│ substrate and a region to be grinded of the array substrate │
└─────────────────────────────────────────────────────────────┘
                              │
                              ▼
┌─────────────────────────────────────────────────────────────┐
│                                                             │  S620
│ Disposing a plurality of supporting spacers in the frame    │
│ sealant                                                     │
└─────────────────────────────────────────────────────────────┘
                              │
                              ▼
┌─────────────────────────────────────────────────────────────┐
│ By a grinding rod and along a grinding direction from the   │  S630
│ array substrate toward the color filter substrate, digging  │
│ the region to be grinded of the array substrate to define   │
│ an opening in the array substrate                           │
└─────────────────────────────────────────────────────────────┘
                              │
                              ▼
┌─────────────────────────────────────────────────────────────┐
│ After the opening of the array substrate is defined, by     │  S640
│ further using the grinding rod along the grinding direction,│
│ partially grinding the region to be grinded of the color    │
│ filter substrate to make an inner surface of the color      │
│ filter substrate curved                                     │
└─────────────────────────────────────────────────────────────┘
```

FIG. 6

LIQUID CRYSTAL DISPLAY PANEL AND MANUFACTURING METHOD THEREOF

RELATED APPLICATIONS

This application is a National Phase of PCT Patent Application No. PCT/CN2019/070102 having International filing date of Jan. 2, 2019, which claims the benefit of priority of Chinese Patent Application No. 201811272513.2 filed on Oct. 30, 2018. The contents of the above applications are all incorporated by reference as if fully set forth herein in their entirety.

FIELD AND BACKGROUND OF THE INVENTION

The present invention relates to a field of liquid crystal display technologies, especially to a liquid crystal display panel and a manufacturing method for the liquid crystal display panel.

The liquid crystal display (LCD) industry has developed rapidly in recent years, and a variety of new heteromorphic mobile phone displays have gradually occupied a large share in the market. Various mobile phone manufacturers have introduced more and more new designs, such as cutout displays, beauty tip displays, water drop displays, drilled displays (i.e., panel hole definitions), and many other new designs. Current development of the panel hole definition process is limited by the current cutting and punching process, such that still no corresponding product launches on the market.

SUMMARY OF THE INVENTION

Conventional in-panel hole defining solutions include two types. One type is a blind hole solution, as shown in FIGS. 1A and 1B, and includes disposing a camera under a blind hole. However, such solution is limited by glass, liquid crystal and film transmission rate, and influences image quality of the camera and lowers user's experience. The other type is a hole defining solution, as shown in FIG. 2. However, such solution is limited by a laser grinding process, a lifespan of a grinding rod thereof is limited and is affected by scrapers and a heat radiation zone. Also, such solution includes a higher cost. In FIGS. 1A, 1B and 2, a liquid crystal display panel includes an array substrate 110, a color filter substrate 120 and a frame sealant 130. Therefore, a new in-panel hole defining manufacturing method is required.

An objective of the present invention is to provide a liquid crystal display panel, the liquid crystal display panel, by an inner surface hole defining process, defines an installation hole, a position of the array substrate corresponding to the installation hole is opened, a position of an inner surface of the color filter substrate corresponding to the installation hole is curved such that the color filter substrate has a lens structure to reduce total reflection between air and the glass substrate (the color filter substrate has a glass base substrate) and increase outwardly directed light and light emitting efficiency. Furthermore, a total reflection coating layer is disposed on a sidewall of the installation hole not only to increase outwardly directed light but also to perform a protective function for the encapsulation, which improves durability of the entire product.

According to an aspect of the present invention, a liquid crystal display panel is provided and comprises: a color filter substrate, wherein the color filter substrate is a light transmissive substrate; an array substrate, wherein the array substrate is disposed opposite to the color filter substrate at an interval; wherein a sealing layer is disposed between the color filter substrate and the array substrate, the sealing layer is hollow to form an installation hole, and the sealing layer is configured to isolate the installation hole from liquid crystal disposed between the color filter substrate and the array substrate; wherein a position of the array substrate corresponding to the installation hole is opened, a position of an inner surface of the color filter substrate corresponding to the installation hole is curved; wherein the sealing layer is made of a frame sealant, the frame sealant is configured to connect the color filter substrate and the array substrate; wherein a plurality of supporting spacers are disposed in the frame sealant; wherein a total reflection coating layer is disposed between the frame sealant and the installation hole.

According to an aspect of the present invention, a liquid crystal display panel is provided and comprises: a color filter substrate, wherein the color filter substrate is a light transmissive substrate; an array substrate, wherein the array substrate is disposed opposite to the color filter substrate at an interval; wherein a sealing layer is disposed between the color filter substrate and the array substrate, the sealing layer is hollow to form an installation hole, and the sealing layer is configured to isolate the installation hole from liquid crystal disposed between the color filter substrate and the array substrate; wherein a position of the array substrate corresponding to the installation hole is opened, a position of an inner surface of the color filter substrate corresponding to the installation hole is curved.

In an embodiment of the present invention, the sealing layer is made of a frame sealant, and the frame sealant is configured to connect the color filter substrate and the array substrate.

In an embodiment of the present invention, a plurality of supporting spacers are disposed in the frame sealant.

In an embodiment of the present invention, the supporting spacers are disposed around a sidewall of the installation hole at equal intervals.

In an embodiment of the present invention, a total reflection coating layer is disposed between the frame sealant and the installation hole.

In an embodiment of the present invention, the total reflection coating layer is made of material comprising a total reflection characteristic.

According another aspect of the present invention, a manufacturing method for the above liquid crystal display panel is also provided. The manufacturing method for the liquid crystal display panel comprises steps as follows: disposing a frame sealant between a color filter substrate and an array substrate and, wherein the frame sealant is disposed in a region to be grinded of the color filter substrate and a region to be grinded of the array substrate; disposing a plurality of supporting spacers in the frame sealant; by a grinding rod and along a grinding direction from the array substrate toward the color filter substrate, digging the region to be grinded of the array substrate to define an opening in the array substrate; and after the opening of the array substrate is defined, by further using the grinding rod along the grinding direction, partially grinding the region to be grinded of the color filter substrate to make an inner surface of the color filter substrate curved.

In an embodiment of the present invention, before the step of partially grinding the color filter substrate, the manufacturing method further comprises: disposing a coating layer at a distal end of the grinding rod; when the color filter substrate is partially grinded, simultaneously by the distal end of the grinding rod coating a layer of total reflection material on a sidewall of the frame sealant to form a total reflection coating layer.

In an embodiment of the present invention, in the step of disposing the supporting spacers in the frame sealant, the supporting spacers are disposed at equal intervals.

In an embodiment of the present invention, a top end of the grinding rod is circular.

Advantage of the present invention lies in that the liquid crystal display panel, by an in-panel hole defining process, defines an installation hole. A position of an array substrate corresponding to the installation hole is opened, a position of an inner surface of the color filter substrate corresponding to the installation hole is curved such that the color filter substrate has a lens structure to decrease total reflection between air and a glass substrate (the color filter substrate has a glass base substrate) and to increase outwardly directed light and light emitting efficiency. Furthermore, a total reflection coating layer is disposed on a sidewall of the installation hole not only to increase outwardly directed light but also to perform a protective function for the encapsulation, which improves durability of the entire product.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

FIG. 6 is a flowchart of a manufacturing method for a liquid crystal display panel of an embodiment of the present invention.

DESCRIPTION OF SPECIFIC EMBODIMENTS OF THE INVENTION

Figure 1A:
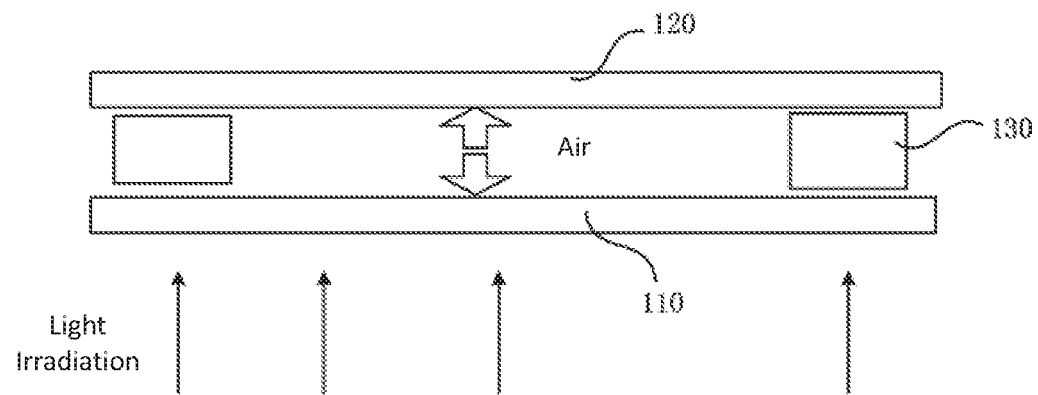
FIGS. 1A and 1B are schematic views of a conventional blind hole solution.
Figure 1B:
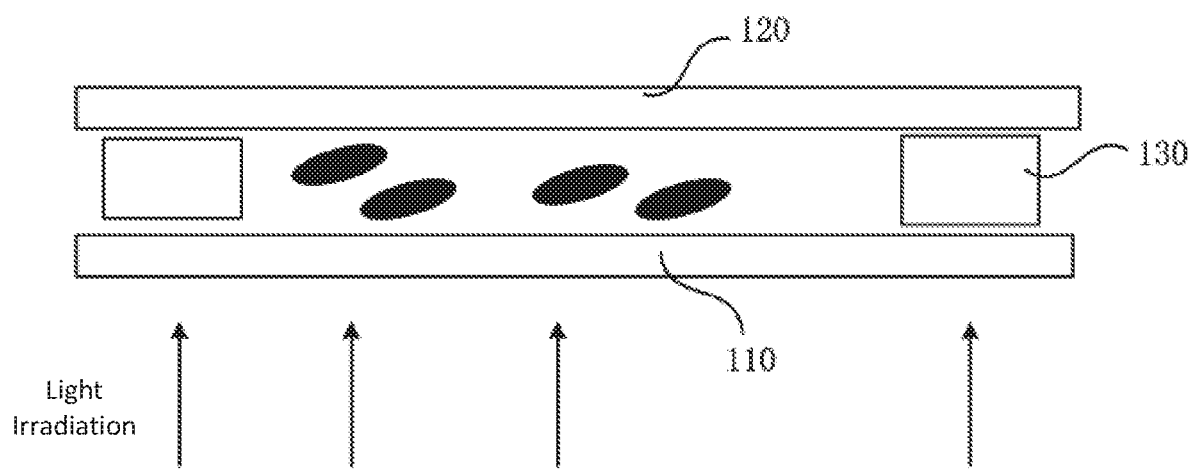
Figure 2:
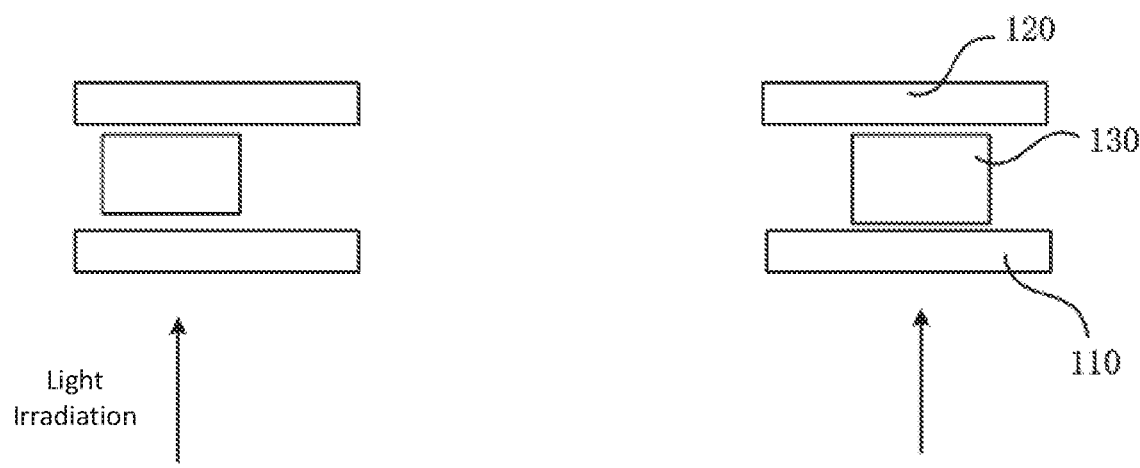
FIG. 2 is a schematic view of a conventional hole defining solution.

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

The specification and claims of the present invention and terminologies "first", "second", "third", etc. (if existing) in the above accompanying drawings are configured to distinguish similar objects and are not configured to describe a specific sequence or order thereof. It should be understood that such described objects can be exchanged with one another in an adequate condition. Furthermore, terminologies "include", "have" and any variant thereof are intended to inclusive inclusion instead of exclusive inclusion.

In the present patent document, the drawings, which are discussed below, are used to describe the principles of the present invention, are for illustrative purposes only and are not to be construed as limiting the scope of the present invention. It will be understood by a person skilled in the art that the principles of the present invention may be implemented in any suitably arranged system. Exemplary embodiments will be described in detail, and examples of the embodiments are illustrated in the accompanying drawings. Further, a device according to an exemplary embodiment will be described in detail with reference to the accompanying drawings. The same reference numerals in the drawings refer to the same elements.

The terminologies used in the specification of the present invention are only used to describe the specific embodiments, and are not intended to show the concept of the present invention. Unless the context clearly has a different meaning, the expression used in the singular form encompasses the plural form of expression. In the present invention, it should be understood that terminologies such as "comprise", "have" and "include" are intended to indicate the possibility of the features, numbers, steps, actions or combinations thereof disclosed in the present invention. It is not intended to exclude the possibility that one or a plurality of other features, numbers, steps, actions or combinations thereof may be added. The same reference numerals in the drawings refer to the same parts.

The present invention embodiment provides a liquid crystal display panel and a manufacturing method for the liquid crystal display panel, which will be described respectively as follows.

Figure 3:
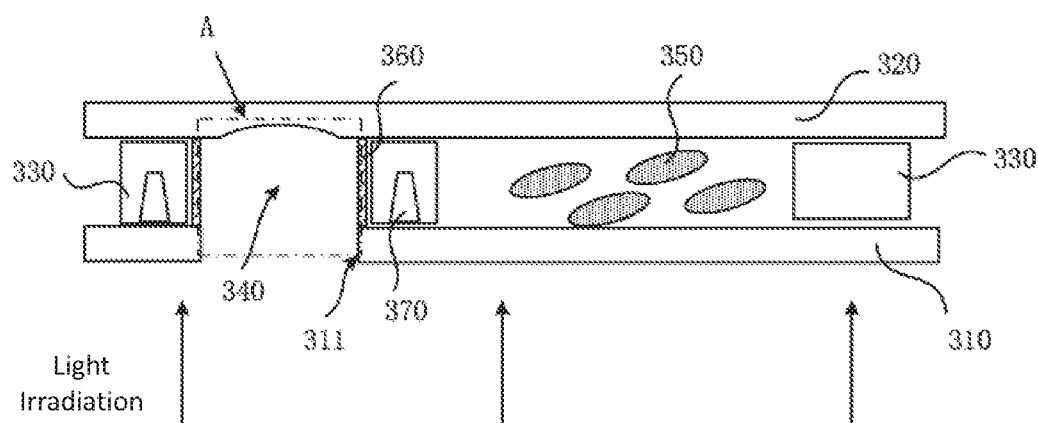
FIG. 3 is a schematic structural view of a liquid crystal display panel of an embodiment of the present invention.
Figure 4:
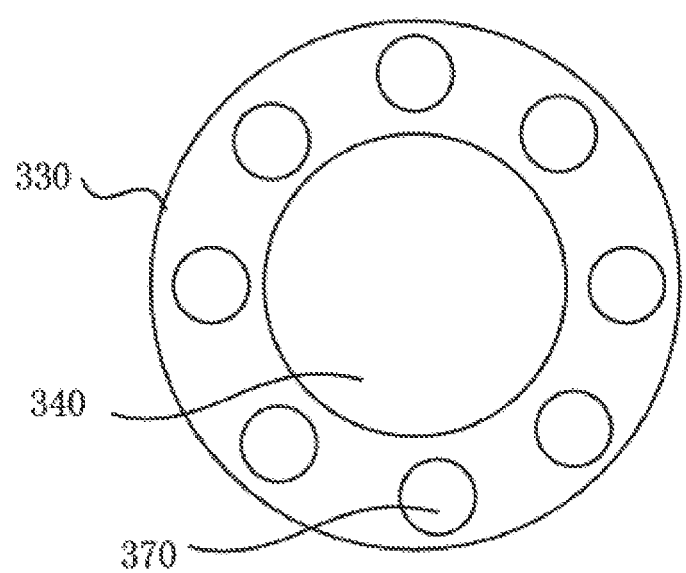
FIG. 4 is a schematic view of a frame sealant and supporting spacers of the embodiment of the present invention observed at an angle.
Figure 5:
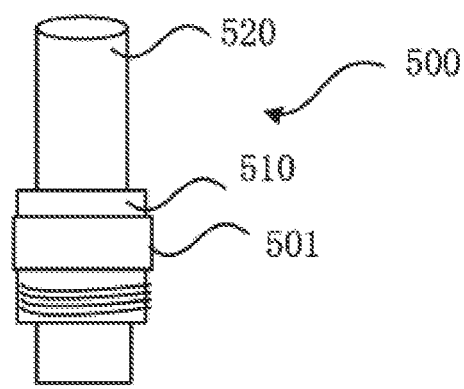
FIG. 5 is a schematic view of a grinding rod of the embodiment of the present invention.

With reference to FIGS. 3 and 5. FIG. 3 is a schematic structural view of a liquid crystal display panel of an embodiment of the present invention. FIG. 4 is a schematic view of a frame sealant and supporting spacers of the embodiment of the present invention observed at an angle. FIG. 5 is a schematic view of a grinding rod of the embodiment of the present invention.

The present invention provides a liquid crystal display panel comprising: a color filter substrate 320, wherein the color filter substrate 320 is a light transmissive substrate; an array substrate 310, wherein the array substrate 310 is disposed opposite to the color filter substrate 320 at an interval. In the present embodiment, each of the color filter substrate 320 and the array substrate 310 has a glass base substrate. Of course, in other embodiments, each of the color filter substrate 320 and the array substrate 310 can be made of quartz, wafer or other adequate material. Specific structures of the color filter substrate 320 and the array substrate 310 are known by a person of ordinary skill in the art and will not be described herein. Furthermore, a liquid crystal (LC) is disposed between the color filter substrate 320 and the array substrate 310.

In the present embodiment, a sealing layer 330 is disposed between the color filter substrate 320 and the array substrate 310. The sealing layer 330 is hollow to define an installation hole 340, and the sealing layer 330 is configured to isolate the installation hole 340 from a liquid crystal 350 disposed between the color filter substrate 320 and the array substrate 310. Specifically, the sealing layer 330 can be made of a frame sealant. Therefore, in the figures, the frame sealant is marked with the same reference numeral 330 as used for the sealing layer. The frame sealant 330 is configured to connect the color filter substrate 320 to the array substrate 310. Furthermore, the frame sealant 330 also performs a function of isolating the installation hole 340 from the liquid crystal. The installation hole 340 can be used for later installation of a device, such as a camera or a sensor. The device, such as a camera or a sensor, is not shown in the drawings.

With reference to FIG. 4, in the present embodiment, a plurality of supporting spacers 370 are disposed in the frame sealant 330. The supporting spacers 370 are disposed around a sidewall of the installation hole 340 at equal intervals. As such, not only the color filter substrate 320 and the array substrate 310 are connected better, but also the frame sealant 330 is more firm and stable for a better effect of isolating the installation hole 340 from the liquid crystal.

With reference to FIG. 3, a position of the array substrate 310 corresponding to the installation hole 340 is opened, in other words, the array substrate 310 includes an opening portion 311. Thus, the opening portion 311 of the array substrate 310 communicates with the installation hole 340.

An inner surface of the color filter substrate 320 corresponding to the installation hole 340 is curved. Because the inner surface of the color filter substrate 320 is curved, i.e. an inner surface of the glass substrate is curved, the curved inner surface cooperates with the opening portion 311 of the array substrate 310 to form a lens-like structure. In other words, the liquid crystal display panel undergoes an in-panel hole defining process such that a side of the liquid crystal display panel has the glass substrate removed, and the other opposite side thereof is grinded to partially remove the glass thereon to form the lens-like structure. Thus, total reflection between air outside the color filter substrate 320 and the glass substrate can be decreased to increase outwardly directed light and light emitting efficiency.

Furthermore, a total reflection coating layer 360 (or called total reflection dielectric film layer) is disposed between the frame sealant 330 and the installation hole 340. The total reflection coating layer 360 is made of material including total reflection characteristics. The total reflection coating layer 360 is formed by a coating layer process implemented after grinding process is completed. By adding the total reflection coating layer 360, outwardly directly light is increased, encapsulation is protected, and the installation hole 340 and the liquid crystal 350 are better isolated from each other, which enhances durability of the products.

Furthermore, with reference to FIGS. 3 to 5 and 6. FIG. 6 is a flowchart of a manufacturing method for a liquid crystal display panel of an embodiment of the present invention The present invention provides a manufacturing method for a liquid crystal display panel. The manufacturing method for the liquid crystal display panel includes step S610, step S620, step S630, and step S640.

The step S610 is disposing a frame sealant between a color filter substrate and an array substrate and, wherein the frame sealant is disposed in a region to be grinded of the color filter substrate and a region to be grinded of the array substrate.

The color filter substrate 320 is a light transmissive substrate. The array substrate 310 is disposed opposite to the color filter substrate 320. In the present embodiment, each of the color filter substrate 320 and the array substrate 310 include a glass base substrate.

The frame sealant 330 serves a sealing material, and is configured to isolate the installation hole 340 corresponding to the region to be grinded from the liquid crystal 350 disposed between the color filter substrate 320 and the array substrate 310. Furthermore, the frame sealant 330 is configured to connect the color filter substrate 320 and the array substrate 310. The installation hole 340 can be used for later installation of a device, such as a camera or a sensor.

In the context of the present specification, the region to be grinded includes the installation hole 340 defined by a sealing layer 330 disposed between the color filter substrate 320 and the array substrate 310.

The step S620 is disposing a plurality of supporting spacers 370 in the frame sealant.

In the step of disposing the plurality of supporting spacers 370 in the frame sealant 330, the plurality of supporting spacers 370 are disposed at equal intervals. Thus, not only the color filter substrate 320 and the array substrate 310 are connected better, but also the frame sealant 330 is more firm and stable for a better effect of isolating the installation hole 340 from the liquid crystal.

The step S630 is by a grinding rod and along a grinding direction from the array substrate toward the color filter substrate, digging the region to be grinded of the array substrate to define an opening in the array substrate.

A top end 520 of the grinding rod 500 is circular. Thus, the color filter substrate 320 can be partially grinded (or called slight grinding) later, the inner surface of the grinded color filter substrate 320 is curved.

The step S640 is after the opening of the array substrate is defined, by further using the grinding rod along the grinding direction, partially grinding the region to be grinded of the color filter substrate to make an inner surface of the color filter substrate curved.

Before the step of partially grinding the color filter substrate 320, the manufacturing method further comprises: disposing a coating layer 501 at a distal end 510 of the grinding rod 500; when the color filter substrate 320 is partially grinded, simultaneously by the distal end 510 of the grinding rod 500 coating a total reflection material on a sidewall of the frame sealant 330 to form a total reflection coating layer 360. By adding the total reflection coating layer 360, outwardly directly light is increased, encapsulation is protected, and the installation hole 340 and the liquid crystal 350 are better isolated from each other, which enhances durability of the products.

Furthermore, the liquid crystal display panel undergoes an in-panel hole defining process such that a side of the liquid crystal display panel (i.e., the array substrate 310) includes an opening portion (i.e., the removed part of the glass of the array substrate 310 corresponding to the opening portion), and the other opposite side thereof (i.e. the color filter substrate 320) is grinded to partially remove the glass thereon to form the lens-like structure. Thus, total reflection between air outside the color filter substrate 320 and the glass substrate can be decreased to increase outwardly directed light and light emitting efficiency.

Furthermore, because the manufacturing method for the liquid crystal display panel merely digs and grinds the array substrate 310, and merely slightly grinds the color filter substrate 320, therefore, in comparison with the conventional method that grinds and penetrates the color filter substrate and the array substrate by laser, the grinding rod of the present invention has a comparatively long lifespan.

The liquid crystal display panel and the manufacturing method for the liquid crystal display panel, by the in-panel hole defining process defines an installation hole 340 in the liquid crystal display panel. A position of the array substrate 310 corresponding to the installation hole 340 is opened, and an inner surface of the color filter substrate 320 corresponding to the installation hole 340 is curved such that the color filter substrate 320 has a lens structure to decrease total reflection between air and the glass substrate (color filter substrate 320 includes a glass base substrate) and increase outwardly directed light and light emitting efficiency. Furthermore, a total reflection coating layer 360 is disposed between a sidewall of the installation hole 340 sidewall not only to increase outwardly directed light but also to perform a protective function for the encapsulation, which improves durability of the entire product.

The above is only a preferred embodiment of the present invention. It should be noted that a person skilled in the art can make several improvements and modifications without departing from the principle of the present invention, and these improvements and modifications should also be considered the scope of protection of the present invention.

The subject matter of the present invention can be manufactured and employed in the industry and has industrial applicability.

What is claimed is:

1. A manufacturing method for a liquid crystal display panel, wherein the manufacturing method comprises steps as follows:

disposing a frame sealant between a color filter substrate and an array substrate of the liquid crystal display panel, wherein the frame sealant is disposed in a region to be grinded of the color filter substrate and a region to be grinded of the array substrate;

disposing a plurality of supporting spacers in the frame sealant;

by a grinding rod and along a grinding direction from the array substrate toward the color filter substrate, digging the region to be grinded of the array substrate to define an opening in the array substrate; and after the opening of the array substrate is defined, by further using the grinding rod along the grinding direction, partially grinding the region to be grinded of the color filter substrate to make an inner surface of the color filter substrate curved;

wherein before the step of partially grinding the color filter substrate, the manufacturing method further comprises:

disposing a coating layer at a distal end of the grinding rod; and when the color filter substrate is partially grinded, simultaneously by the distal end of the grinding rod coating a layer of total reflection material on a sidewall of the frame sealant to form a total reflection coating layer.

2. The manufacturing method for the liquid crystal display panel as claimed in claim 1, wherein in the step of disposing the supporting spacers in the frame sealant, the supporting spacers are disposed at equal intervals.

3. The manufacturing method for the liquid crystal display panel as claimed in claim 1, wherein a top end of the grinding rod is circular.

* * * * *